(12) United States Patent
Li et al.

(10) Patent No.: US 10,585,779 B2
(45) Date of Patent: Mar. 10, 2020

(54) SYSTEMS AND METHODS OF REQUIREMENTS CHAINING AND APPLICATIONS THEREOF

(71) Applicant: General Electric Company, Schenectady, NY (US)

(72) Inventors: Meng Li, Niskayuna, NY (US); Han Yu, Niskayuna, NY (US); Daniel Russell, Grand Rapids, MI (US); Michael Durling, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/049,487

(22) Filed: Jul. 30, 2018

(65) Prior Publication Data
US 2020/0034273 A1 Jan. 30, 2020

(51) Int. Cl.
*G06F 9/44* (2018.01)
*G06F 11/36* (2006.01)

(52) U.S. Cl.
CPC ...... *G06F 11/3616* (2013.01); *G06F 11/3676* (2013.01); *G06F 11/3684* (2013.01)

(58) Field of Classification Search
CPC ............. G06F 11/3616; G06F 11/3676; G06F 11/3684
USPC .................................................. 717/124–135
See application file for complete search history.

(56) References Cited

U.S. PATENT DOCUMENTS

| | | | | |
|---|---|---|---|---|
| 5,790,871 A | * | 8/1998 | Qureshi | G06F 11/2221 702/123 |
| 6,002,869 A | | 12/1999 | Hinckley | |
| 6,061,449 A | * | 5/2000 | Candelore | G06F 12/1408 380/28 |
| 6,279,124 B1 | | 8/2001 | Brouwer et al. | |
| 7,644,334 B2 | | 1/2010 | Hickman et al. | |
| 7,865,339 B2 | | 1/2011 | Rushby et al. | |

(Continued)

OTHER PUBLICATIONS

Ferguson et al., "Generating test data for distributed software using the chaining approach", 1996, Elsevier Science, pp. 343-353 (Year: 1996).*

(Continued)

*Primary Examiner* — Ted T. Vo
(74) *Attorney, Agent, or Firm* — Buckley, Maschoff & Talwalkar LLC

(57) ABSTRACT

A method and system, the method including receiving a set of requirements for a software application, the set of requirements comprising a plurality of software requirements identified for the software application; analyzing the set of requirements to determine dependencies between the plurality of software requirements in the set of requirements; generating a visualization of the determined dependencies and test boundaries between the plurality of software requirements in the set of requirements; storing the generated visualization of the determined dependencies and test boundaries between the plurality of software requirements in the set of requirements in a record; and applying the determined dependencies in the record to at least one of (i) optimize test steps in a test procedure and (ii) generate an executable test procedure that exercises external inputs and outputs for the software application.

20 Claims, 11 Drawing Sheets

(56) References Cited

U.S. PATENT DOCUMENTS

| | | | |
|---|---|---|---|
| 8,473,913 B2* | 6/2013 | Noller | G06F 11/3688 |
| | | | 717/124 |
| 8,745,589 B2 | 6/2014 | Arumugham et al. | |
| 9,940,222 B2 | 4/2018 | Li et al. | |
| 2015/0178182 A1 | 6/2015 | Mallya | |
| 2017/0039039 A1 | 2/2017 | Johnson et al. | |
| 2017/0228309 A1 | 8/2017 | Manolios et al. | |

OTHER PUBLICATIONS

Ferguson et al., "The Chaining Approach for Software Test Data Generation", 1996, ACM, pp. 63-86 (Year: 1996).*

Oliva, et al., "IVAR: A Conceptual Framework or Dependency Management", 2015, Research Gate, 9 pages (Year: 2015).*

Jeff Tian, "Software Quality Engineering—Testing, Quality Assurance, and Quantifiable Improvement", 2005, IEEE, 411 pages. (Year: 2005).*

Ferguson, Roger et al., "Software test data generation using the chaining approach," Proceedings of 1995 IEEE International Test Conference (ITC), Washington, DC, 1995, (pp. 703-709, 7 total pages).

Brahim, Rosziati et al., "An Automatic Tool for Generating Test Cases from the System's Requirements," 7th IEEE International Conference on Computer and Information Technology (CIT 2007), Fukushima, 2007, (pp. 861-866, 6 total pages).

Li, Meng et al., "Stateflow to Extended Finite Automata Translation," 2011 IEEE 35th Annual Computer Software and Applications Conference Workshops, Munich, 2011, DOI: 10.1109/COMPSACW. 2011.11, (pp. 1-6, 6 total pages).

Zhou et al., "Semantic Translation of Simulink Diagrams to Input/Output Extended Finite Automata," Discrete Event Dynamic Systems, vol. No. 22, Issue No. 2, Jun. 2012, DOI: 10.1007/s10626-010-0096-1, (pp. 223-247, 25 total pages).

Li, Meng et al., "Model-Based Automatic Test Generation for Simulink/Stateflow using Extended Finite Automaton," 2012 IEEE International Conference on Automation Science and Engineering (CASE), Seoul, Aug. 22-24, 2012, (pp. 857-862, 6 total pages).

Li, Meng et al., "Reduction of Automated Test Generation for Simulink/Stateflow to Reachability and its Novel Resolution," 2013 IEEE International Conference on Automation Science and Engineering (CASE), Madison, WI, 2013, (pp. 1089-1094, 6 total pages).

Li, Meng et al., "Recursive Modeling of Stateflow as Input/Output-Extended Automaton," IEEE Transactions on Automation Science and Engineering, vol. No. 11, Issue No. 4, Oct. 2014, DOI: 10.1109/TASE.2013.2272535, (pp. 1229-1239, 11 total pages).

"Automated Testing and Validation with Reactis", Reactive Systems Inc, Retrieved from: http://www.reactive-systems.com/ on May 14, 2018, pp. 1-2, 2 total pages.

"Identify and isolate design errors and generate tests", Mathworks Simulink Design Verifier, Retrieved from: http://www.mathworks.com/products/sldesignverifier/ on May 15, 2018, pp. 1-5, 5 total pages.

"Simulation and Model-based design", Mathworks Simulink, Retrieved from: http://www.mathworks.com/products/simulink/ on May 15, 2018, pp. 1-6, 6 total pages.

"NuSMV: a new symbolic model checker", Retrieved from: http://nusmv.fbk.eu/ on May 15, 2018, pp. 1-4, 4 total pages.

"Critical Systems and Software Development Solutions", Scade, Retrieved from: http://www.esterel-technologies.com/products/scade-suite/ on May 15, 2018, pp. 1-3, 3 total pages.

* cited by examiner

100

105 — RECEIVE A SET OF REQUIREMENTS FOR A SOFTWARE APPLICATION, THE SET OF REQUIREMENTS COMPRISING A PLURALITY OF SOFTWARE REQUIREMENTS IDENTIFIED FOR THE SOFTWARE APPLICATION

110 — ANALYZE THE SET OF REQUIREMENTS TO DETERMINE DEPENDENCIES BETWEEN THE PLURALITY OF SOFTWARE REQUIREMENTS IN THE SET OF REQUIREMENTS

115 — GENERATE A VISUALIZATION OF THE DETERMINED DEPENDENCIES AND TEST BOUNDARIES BETWEEN THE PLURALITY OF SOFTWARE REQUIREMENTS IN THE SET OF REQUIREMENTS

120 — STORE THE GENERATED VISUALIZATION OF THE DETERMINED DEPENDENCIES AND TEST BOUNDARIES BETWEEN THE PLURALITY OF SOFTWARE REQUIREMENTS IN THE SET OF REQUIREMENTS IN A RECORD

*FIG. 1*

SYSTEMS AND METHODS OF REQUIREMENTS CHAINING AND APPLICATIONS THEREOF

BACKGROUND

The present disclosure relates, generally, to software requirements and, more specifically, to determining software requirements chaining and applying the requirements chaining in a test generation process.

Some software applications and packages might be tested to determine whether the software applications comply with or otherwise satisfy a set of software requirements. In some instances, a software application or package might be required to be tested to satisfy a specific or mandated requirement test coverage. For example, safety-critical software, including but not limited to aviation software, might be required by one or more software certification standards to meet specifically defined software requirement test coverage(s).

Therefore, a system and a method that will address the foregoing issues is desirable that can efficiently determine software requirements chaining and apply the requirements chaining in a test generation process.

DESCRIPTION OF THE DRAWINGS

These and other features and aspects of embodiments of the present disclosure will become better understood when the following detailed description is read with reference to the accompanying drawings, in which like characters represent like parts throughout the drawings, wherein:

FIG. 1 is an illustrative flow diagram of an overall process, according to some embodiments;

DETAILED DESCRIPTION

Figure 2:
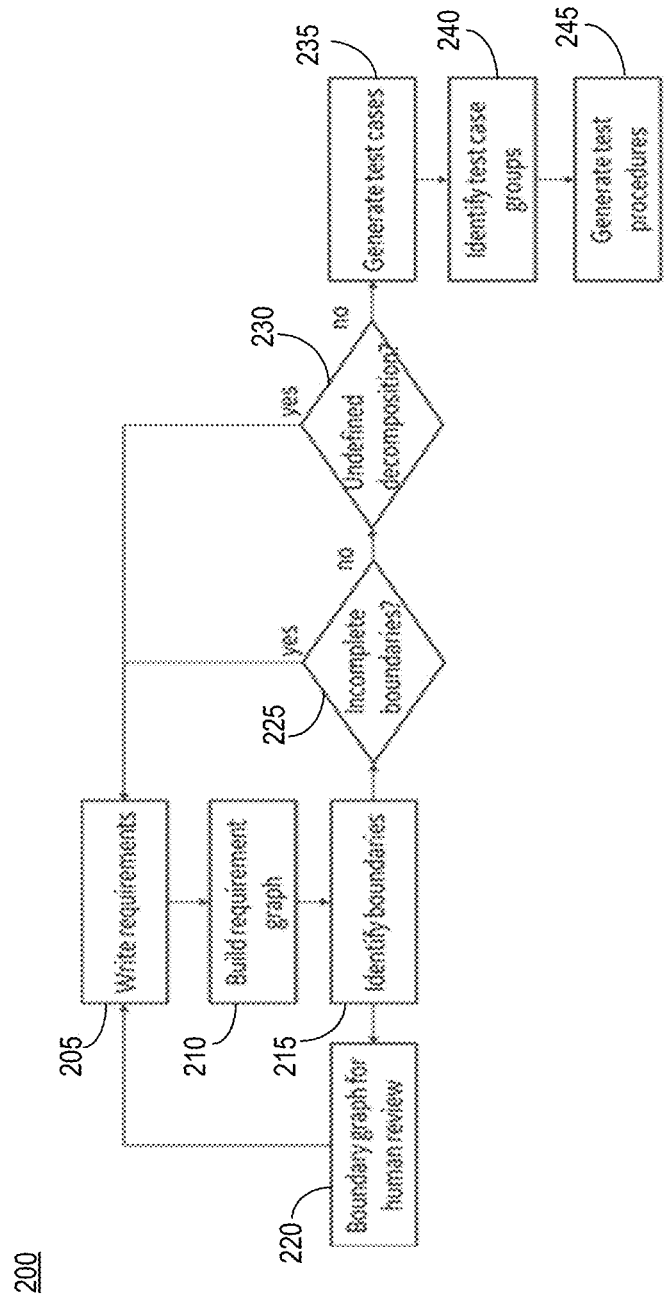
FIG. 2 is an illustrative flow of a process, according to some embodiments.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In some aspects, the present disclosure relates to a system and a process providing technical advantages that include, for example, an analysis of requirements for a software application or package, including a determination of how the requirements are related to each other; providing visualized feedbacks or representations of the requirements relationships/dependencies to an entity (e.g., an engineer or other personnel, an automated testing system, etc.); and using the relationships of requirements to optimize test steps of a test procedure and to generate test procedures. Systems implementing the processes disclosed herein are improved to analyze and determine software requirements and the dependencies therebetween (i.e., requirements chaining), for example, in a more efficient and complete manner, as well as being enabled to apply the requirements chaining to improve software test generation.

In some aspects, complex software requirements (e.g., aviation software applications) may have numerous and complicated dependencies, including for example, multiple levels of dependencies. In some instances, a target component to be tested may have internal requirements (i.e., requirements specifying an intermediate behavior of a component) without specifying an external input/output. Thus, these internal requirements are not independently testable since no external input/output information is provided for the internal requirements. In some aspects herein, internal requirements might be combined with other requirements specifying external input/output behaviors to obtain testable parameters that may be used to complete a test generation. In some embodiments herein, the present disclosure includes systems and methods to identify the associating or chaining of the software requirements for a software application or package (i.e., software) and further, an application of the chaining information to, for example, optimize test steps and generate executable test procedures. In some aspects, the present disclosure describes two types of chaining, horizontal chaining and vertical chaining, as well as the implications thereof to test generation.

Some aspects of the present disclosure describe methods to construct a visualization representation (e.g., a requirement graph) of requirements (e.g., horizontally and vertically chained requirements) and identify test boundaries from the requirement graph.

In some aspects, software requirements may depend on other software requirements. For example, one requirement may share variables with another requirement. As used herein, the interdependent behavior between different requirements is referred to as requirements chaining. Requirements that are chained may provide useful information for an automated test generation (ATG) process, wherein such information may be used to generate and/or optimize test procedures.

In some aspects, given a set of requirements for which we want to generate test procedures, we may need to analyze the relationships between the requirements. The analysis may include determining which requirements use outputs of other requirements; what are the internal and external inputs/outputs for the set of requirements; how are the requirements related; and provide visualized feedback that illustrates the determined requirements relationships. Results of the analysis might be used to generate test procedures and/or optimize the test steps of a test procedure.

In some embodiments, there may be two types of requirements chaining—horizontal chaining and vertical chaining. Horizontal chaining of requirements refers to requirements that only define the behavior of internal variables, where the internal variables cannot be externally monitored or controlled. So that "internal" requirements can be testable, the internal requirements may be chained with other (i.e., external) requirements that define the behavior of the external inputs and outputs of a software application or component.

In some aspects, some requirements may be referred to as "decomposition requirements", wherein the behavior(s) of decomposition requirements are not fully defined. Instead, decomposition requirements rely on other, lower level requirements to fully define their behavior. In some aspects, decomposition requirements might, for example, be expressed in (at least partially) abstract terms rather than explicitly defined. Associating, linking, or otherwise chaining decomposition requirements with lower level requirements to fully define their behavior can provide a mechanism to generate concrete test procedures for the decomposition requirements. Herein, this type of requirements chaining is referred to as vertical chaining.

In some embodiments regarding horizontal chaining, ATG analyzes a set of requirements and identifies groups of requirements that form connected components through the variables shared between the requirements. Each connected component is referred to as a requirement boundary herein, where the requirement boundary includes a set of external input/output variables and a set of requirements within the boundary. In some embodiments, a boundary graph may be generated for each requirement boundary to, for example, assist or facilitate, a user (e.g., a help requirement engineer, etc.) in examining and/or determining whether the requirements are chained sufficiently, correctly, or whether external inputs/outputs are defined correctly.

In some embodiments, requirement boundaries determined herein may be applied in one or more areas of ATG processes. Example ATG applications can include the following areas: (1) test procedure generation from ATG that only includes the setting of the external inputs and checking of the external outputs, where each requirement boundary introduces one test procedure file; and (2) test step optimization that considers requirement chaining so that, for example, multiple test cases that share the same external input/output settings might be tested in one test step.

In some embodiments regarding vertical chaining, an ATG process identifies vertical chaining by identifying whether there are lower level requirements defining behavior(s) of decomposition functions in the decomposition requirements. It is noted that the lower level requirements use the input and return parameters of the corresponding decomposition functions as the monitored and controlled variables of the requirements. In some instances, there may be multiple levels of vertical chaining. In some regards, an ATG process iterates through all levels of vertical chains and determines a group of lower level requirements that fully defines the behavior of a decomposition requirement.

In some embodiments, vertical chaining information may also be represented in a boundary graph along with horizontal chaining information. In some regards, users (e.g., requirements engineers, etc.) may examine a boundary graph and identify, if any, errors in the vertical chaining presented therein.

In some embodiments, vertical chaining may be applied in ATG processes in one or more of the areas, including, for example, (1) to generate test procedures for test cases where decomposition functions are fully defined with vertically chained lower level requirements; and (2) test procedure step optimization that considers vertical chaining so that, for example, multiple test cases that share the same external input/output settings can be tested in one test step.

FIG. 1 is an illustrative example of a flow diagram of a process herein, according to some embodiments. Process 100 is an overview of a number of aspects of the present disclosure. In some embodiments, process 100 may be implemented by a system including a processor executing computer instructions to effectuate the operations of process 100. At operation 105, a set of requirements for a software application or software component may be received. The set of requirements may comprise a plurality of software requirements identified for the software application. Prior to operation 105 or as a part thereof, the set of requirements may be formally captured by an entity (e.g., an engineer or other personnel, an automated system/process, and combinations thereof) and represented in a human and/or machine readable format, as appropriate to its use and application.

Operation 110 includes analyzing the set of requirements to determine dependencies between the plurality of software requirements in the set of requirements. As mentioned hereinabove, the dependencies may include horizontal chained dependencies and vertical chained dependencies. Additional details regarding an exemplary analysis of a set of requirements will be discussed below.

At operation 115, a visualization of the determined dependencies between the plurality of software requirements in the set of requirements is generated. The visualization may be used by a user (e.g., a person and/or a machine) to verify and confirm an accuracy and/or completeness of the dependencies determined at operation 110 for the set of requirements. In some instances, further modification (i.e., operation 105) may be performed to correct and/or complete the dependencies between the plurality of software requirements in response to a user's review of the visualization.

At operation 120, a record of the generated visualization of the determined dependencies between the plurality of software requirements in the set of requirements may be stored in a memory or other data store. The record may comprise a tangible, known or future developed data structure. In some contexts, the record of the visualization including representations of the determined dependencies between the plurality of software requirements in the set of requirements may be retrieved from its stored location and used in other operations, processes, and further analyses and reporting.

In some embodiments, a process of requirements chaining and its associated test generation is illustrated in the example flow diagram of FIG. 2, according to some embodiments herein. Process 200 might commence with requirement engineers (or other personnel or a system) capturing or otherwise representing the requirements for a software application or component in a formal language (e.g., structured, unstructured, or a combination thereof) that can be machine readable. The captured or written requirements document the definitions of the set of requirements for the software application, with the definitions of each requirement specifying a behavior of variables defining each respective requirement.

The written requirements are used at operation 210 to build a requirement graph that visually represents and describes how requirements are sharing variables therebetween. In some embodiments, a data structure representing the requirement graph may include additional information (e.g., metadata) describing the relationships between the requirements in the requirement graph. In some embodiments, each requirement is a node and if two requirements share a variable, then these requirements will be connected through the shared variable.

A boundary identification process is applied at operation 215 to identify the boundaries in the requirement graph generated at operation 210 and a graph with identified boundaries will be generated for a requirement engineer (or other personnel) to review at operation 220. If the boundary identification module at 215 identifies a boundary that is incomplete (i.e., some internal variables do not have a path to external input and output variables), then the identification module will notify the requirement engineer at 220 so that they can modify the written requirements at 205 to add the missing or incomplete requirements. In an automated portion of process 200, if the identification module identifies an incomplete boundary (for a horizontal requirement) at 225 or a decomposition requirement that is not fully defined at 230, then process 200 can also notify a user (e.g., the requirement engineer or other personnel) to modify the written requirements and returns to operation 205 so test generation process 200 can continue.

In the event operations 225 and 230 do not identify any issues, then process 200 can advance to operation 235 where requirements-based test strategies may be applied to individual requirements to generate test cases. The generated test cases may be further analyzed by considering the determined boundaries to determine which group of test cases (if any) can be tested together (i.e., optimized) where the same external input/output assignments activate a set of test cases. Test procedures may then be generated at operation 245 for each test case group where only external input/output assignments are written so the test procedures can be executable in a target test platform.

Figure 3:
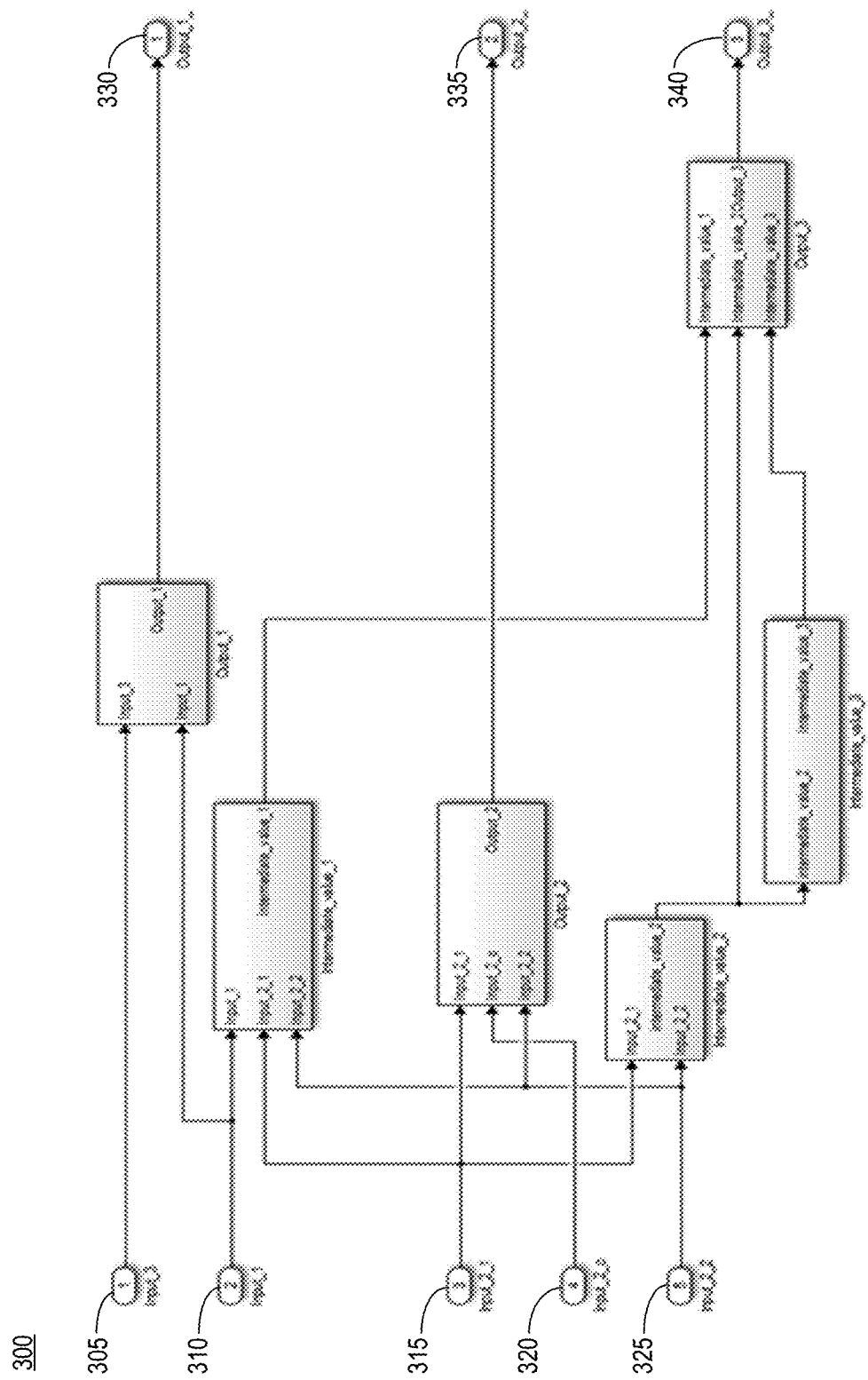
FIG. 3 is an illustrative example of a set of requirements, according to some embodiments.

Referring to FIG. 3, a test interface is identified or otherwise determined for requirements graph including a set of requirements 300. In this illustrative example, the test interface is identified in the requirements ontology as part of the interface definition and properties can be defined to be a "Test_Input", "Test_Output", "Test_Input_Output", or "No_Test_Interface". Referring to the example of FIG. 3, the external test interfaces are shown as inports (e.g., 305, 310, 315, 320, and 325) and outports (e.g., 330, 335, and 340).

FIGS. 4-9 relate to an example set of requirements 300 and operate to disclose an example of how a boundary identification process or module (e.g., FIG. 2, 215) identifies a test boundary for the set of requirements, where each figure illustrates some aspects of the chaining process, according to some embodiments herein.

Figure 4:
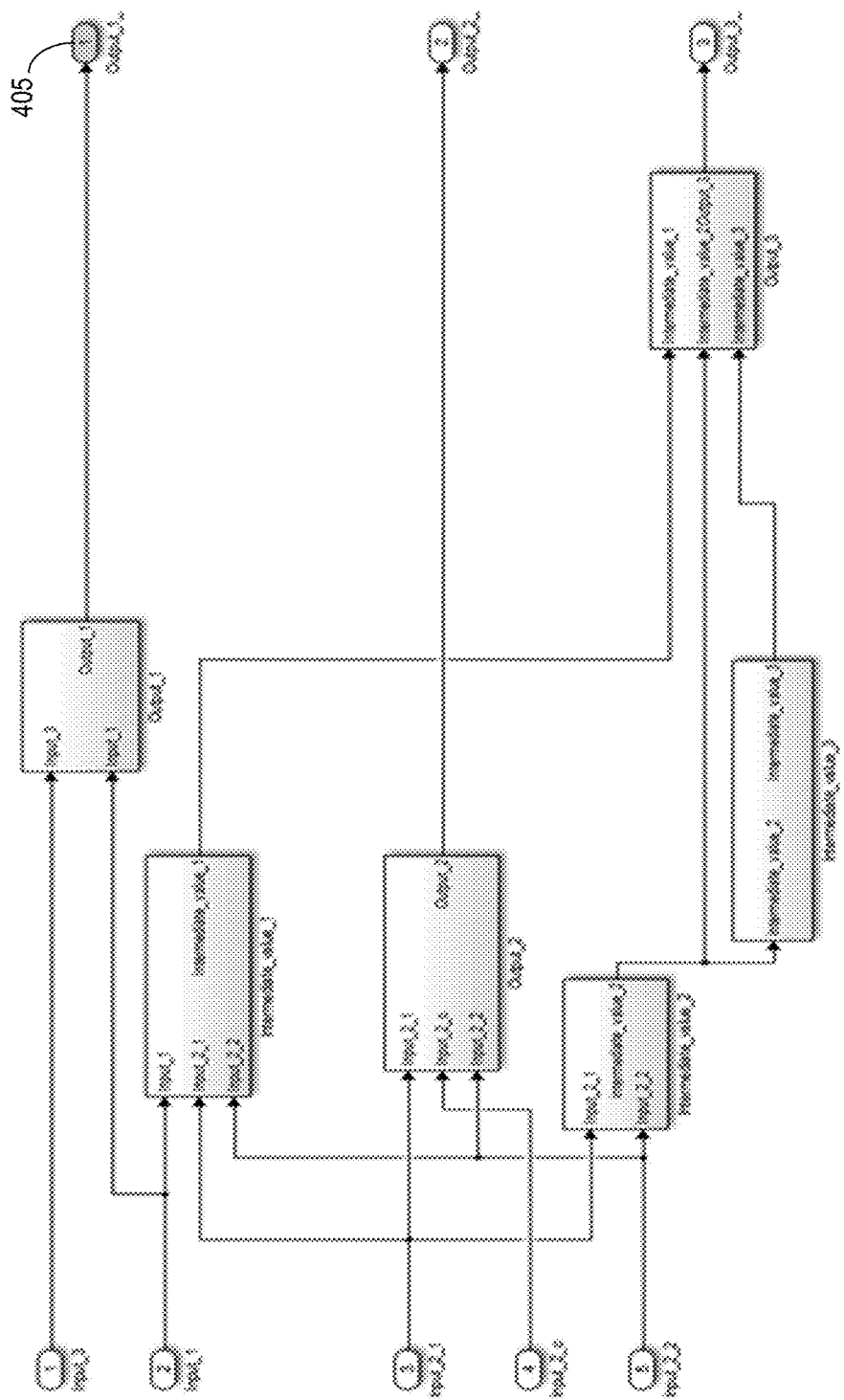
FIGS. 4-9 are each illustrative examples of a set of requirements illustrating some aspects of a requirements chaining process, according to some embodiments.

Having identified the test interfaces, a next step is to identify a "black box" (i.e., a test boundary) for testing that satisfies, for example, the following criteria of: (i) all controlled variables have a Test Output; (ii) all monitored variables have a Test Input; and (iii) all monitored variables have dependent controlled variables included in black box. As an example of a set of requirements 300 that can be chained, we can start by choosing a controlled variable (i.e., output), for example output_1 (405), as shown in FIG. 4.

Figure 5:
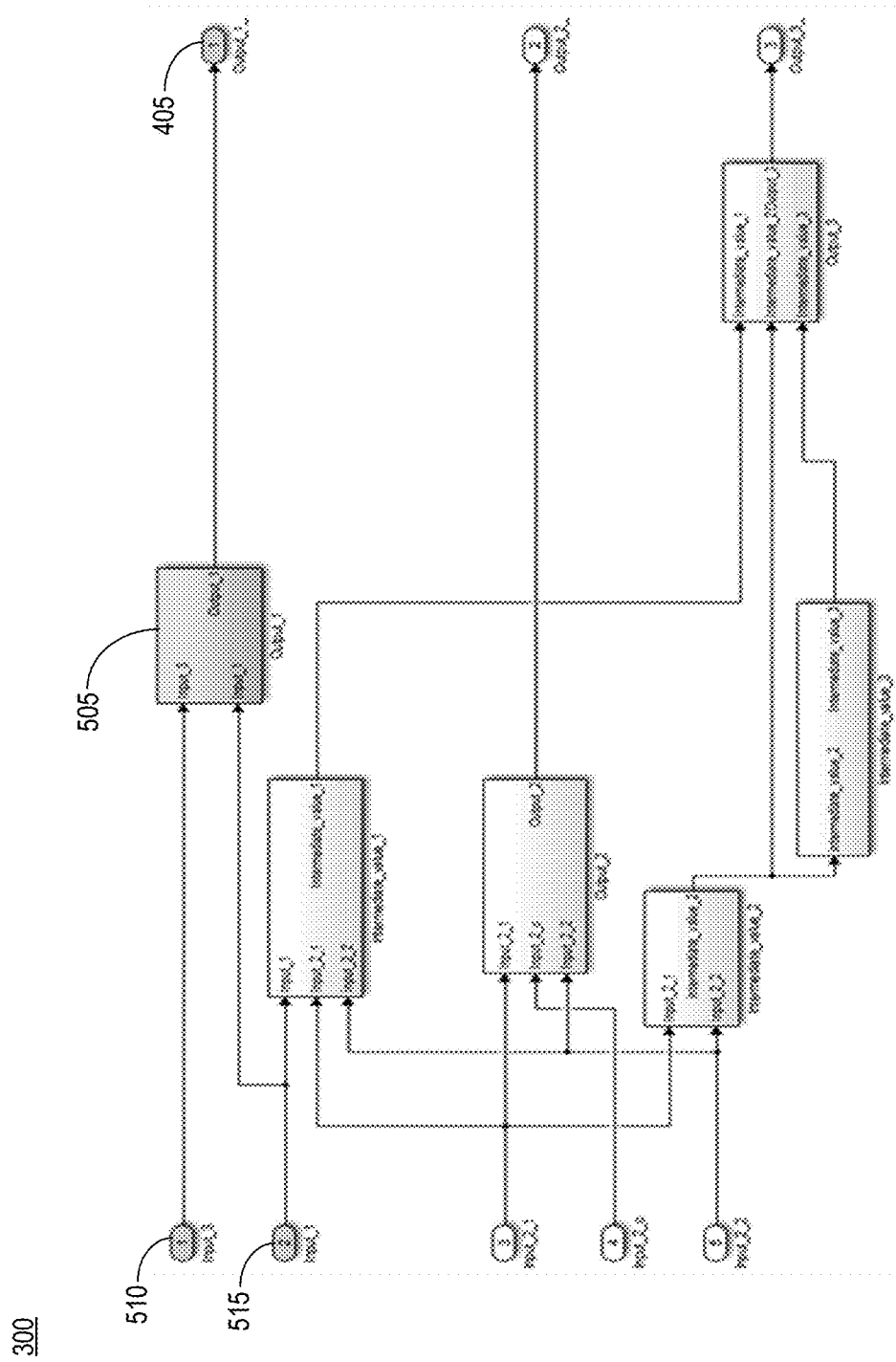

Continuing with this example for the set of requirements 300, FIG. 5 illustrates an identification of (if any) requirements 505 and monitored variables for controlled variable 405 until they are terminated at identified test inputs (510, 515). The requirements and monitored variables highlighted in FIG. 5 may be identified or otherwise determined during a second iteration or traversal of the set of requirements 300.

Figure 6:
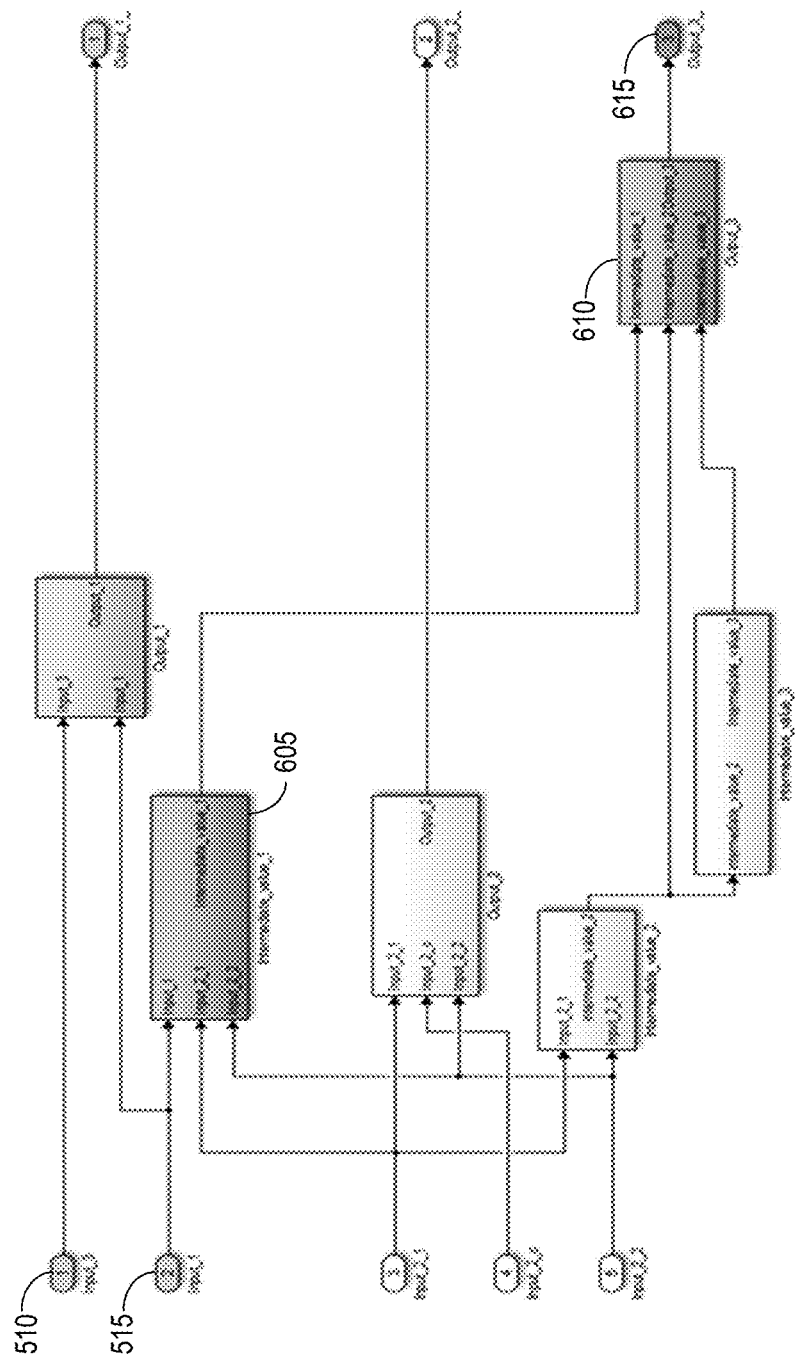

During a third iteration of the set of requirements 300, any dependent controlled variables and requirements on the test inputs 510 and 515 are identified. As shown in FIG. 6, controlled variable 615 (i.e., "Output_3") and requirements 605 and 610 depend from test input 515 (i.e., "Input_1").

Figure 7:
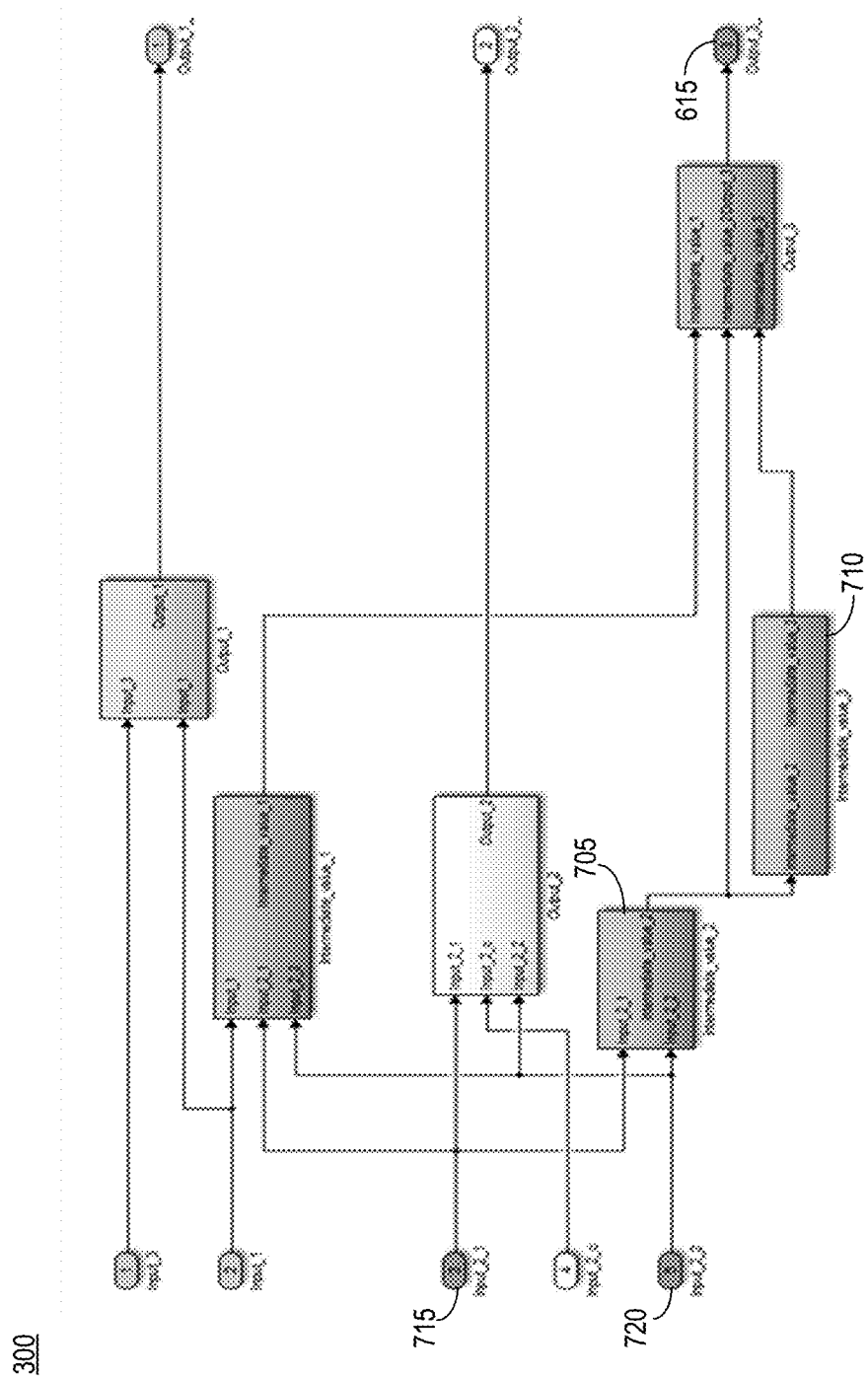

During a fourth iteration of the set of requirements 300, any requirements and monitored variables for controlled variable 615 are identified until they are terminated at test inputs. As shown in FIG. 7, requirements 705 and 710 and monitored variables (i.e., test inputs) 715 and 720 are identified as being related (i.e., chained) to controlled variable 615.

Figure 8:
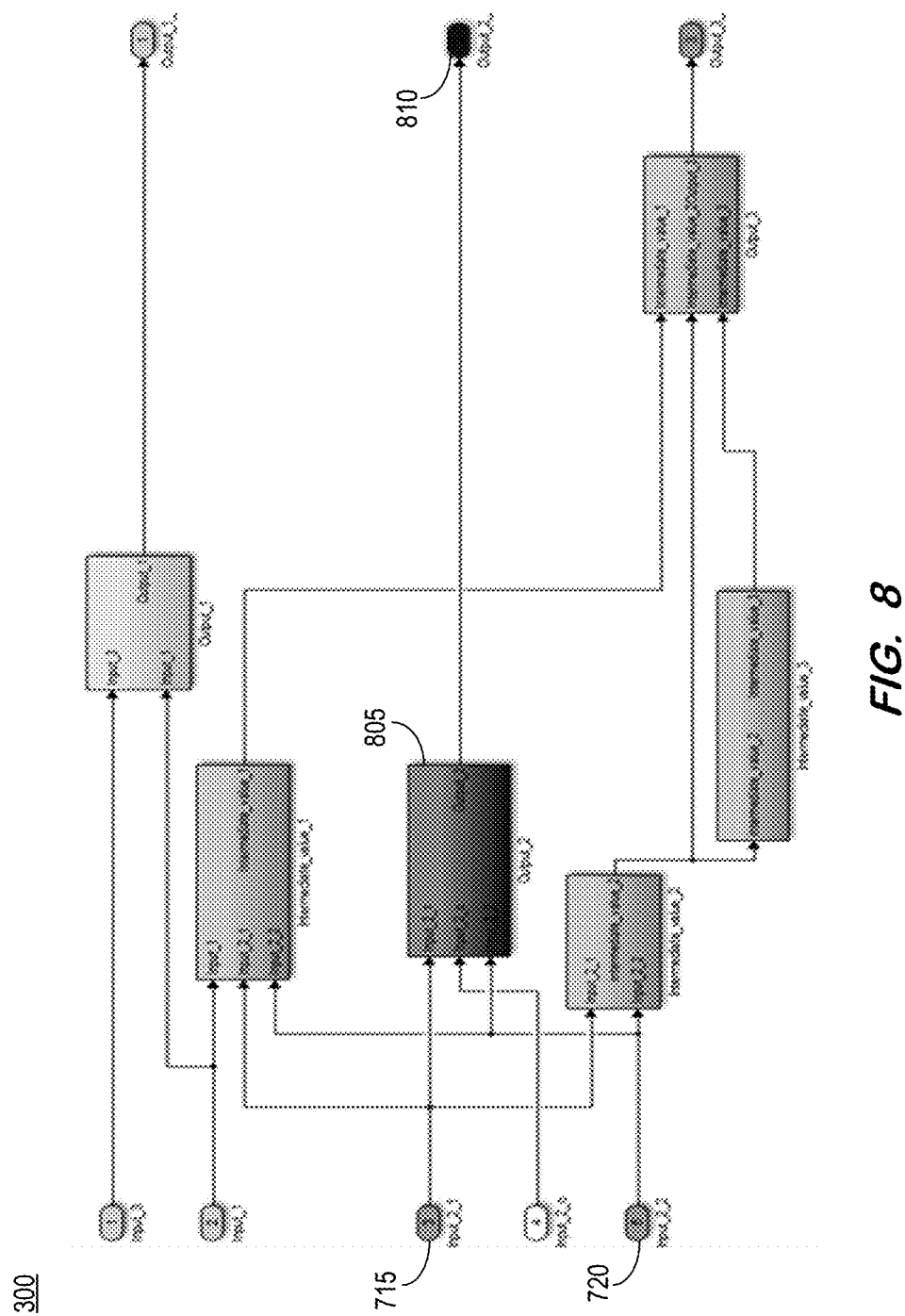
Figure 9:
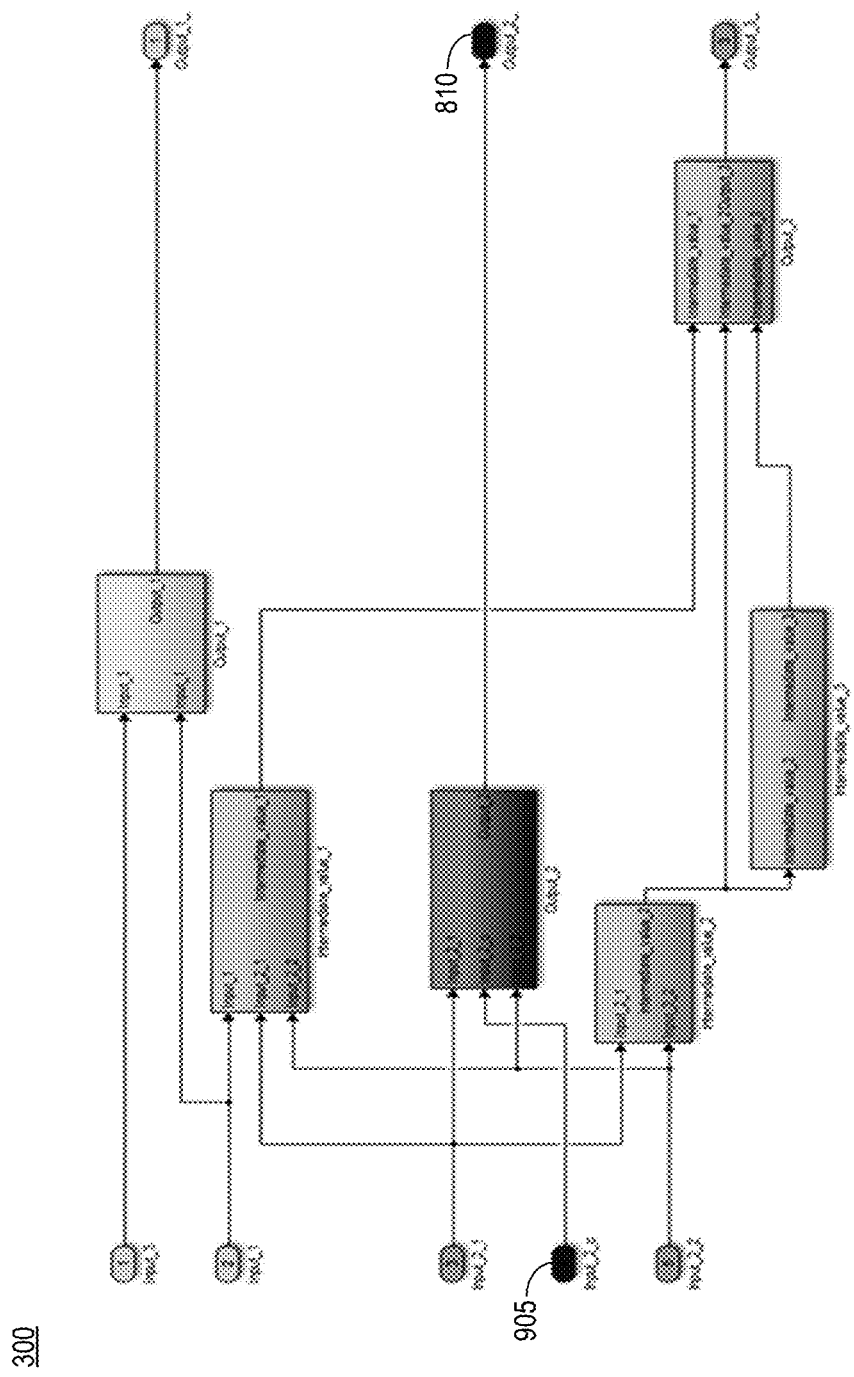

During a fifth iteration of the set of requirements 300, any dependent controlled variables and requirements on the test inputs 715 and 720 are identified. As illustrated in FIG. 8, the requirement 805 and the controlled variable (i.e., output) 810 are identified as depending from test input 720.

During a sixth iteration of the set of requirements 300, any requirements and monitored variables for controlled variable 810 (i.e., "Output_2") are identified or otherwise determined until they are terminated at test inputs. In the illustrative depiction of FIG. 9, monitored variable 905 (i.e., "Input_2_0") is identified as being chained to controlled variable 810. As seen from FIG. 9, there are no additional unidentified test dependencies. Accordingly, a test boundary for the set of requirements in requirement graph 300 may be identified.

Figure 10:
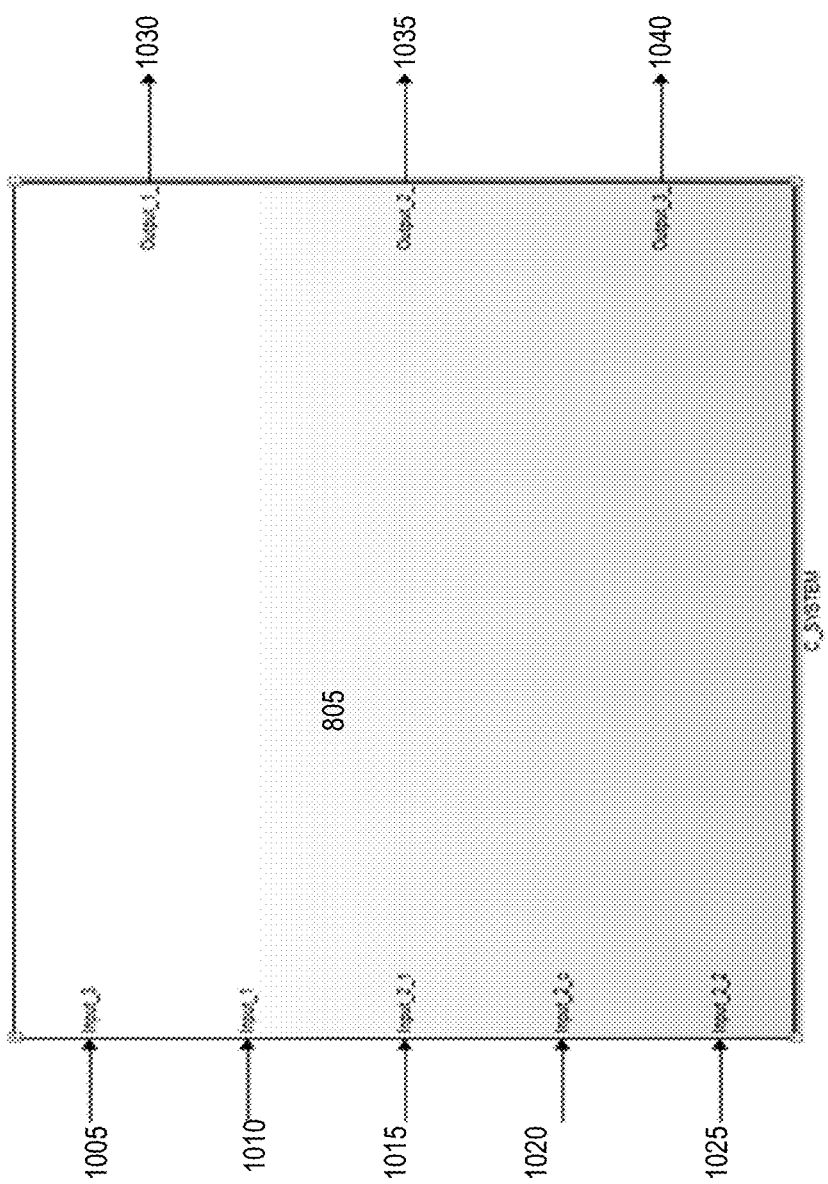
FIG. 10 is an illustrative example of a test boundary identified and determined for the set of requirements of FIG. 3, according to some embodiments.

FIG. 10 is the "block box" identified as the test boundary for the set of requirements for the present example. As shown by the present detailed example, all of the dependent and interrelated requirements of the set of requirements have been combined or reduced to monitored variables (e.g., 1005, 1010, 1015, 1020, and 1025) and controlled variables (e.g., (1030, 1035, and 1040) that can be monitored and controlled for testing purposes.

Figure 11:
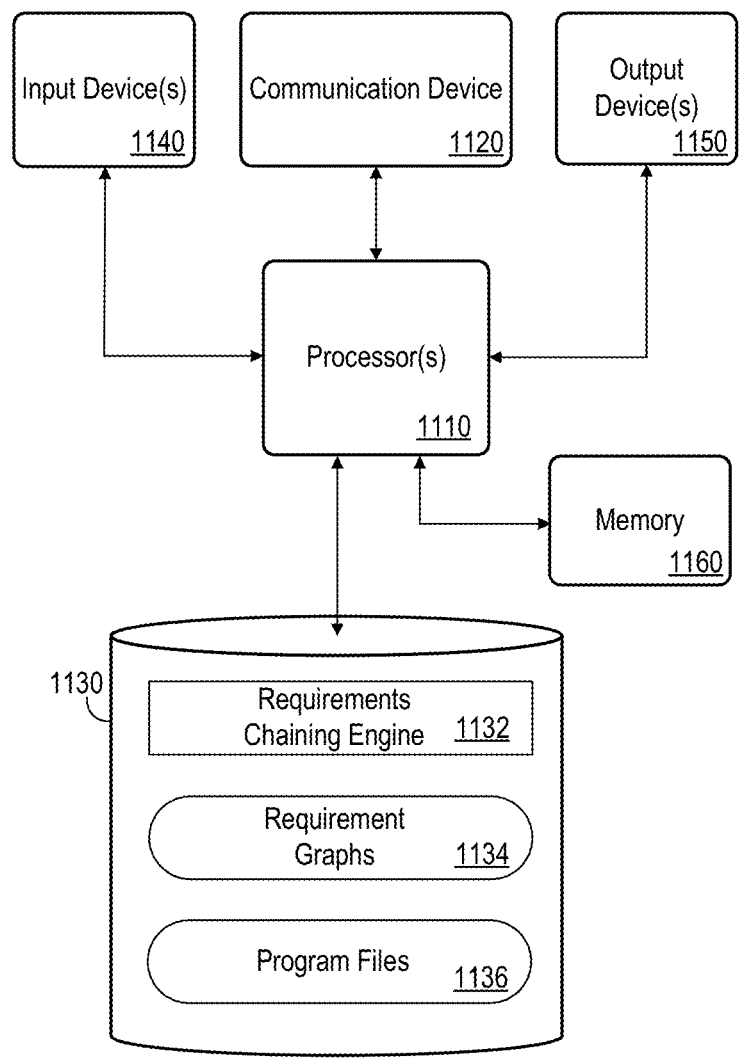
FIG. 11 is a block diagram of an apparatus, according to some embodiments.

FIG. 11 is a block diagram of computing system 1100 according to some embodiments. System 1100 may comprise a general-purpose or special-purpose computing apparatus, platform, or architecture and may execute program code or instructions to perform any of the methods, operations, and functions described herein. System 1100 may comprise an implementation of one or more systems and processes (e.g., 100 and 200). System 1100 may include other elements that are not shown, according to some embodiments.

System 1100 includes processor(s) 1110 operatively coupled to communication device 1120, data storage device 1130, one or more input devices 1140, one or more output devices 1150, and a memory 1160. Communication device 1120 may facilitate communication with external devices, such as a data server and other data sources and/or data streams. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into system 1100 by a user or other authorized personnel. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Requirements chaining engine 1132 may comprise program code executed by processor(s) 1110 to cause system 1100 to perform any one or more of the processes described herein. Embodiments are not limited to execution by a single apparatus. Requirements graphs 1134 may be stored in data storage device 1130. In some instances, data storage device might comprise a database. Data storage device 1130 may also store other data and other program files 1136 for providing additional functionality and/or which are necessary for operation of system 1100, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

This written description uses examples to explain the disclosure, including the best mode, and also to enable any person skilled in the art to practice the disclosure, including making and using any devices or systems and performing any incorporated methods. The patentable scope of the disclosure is defined by the claims appended hereto, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a memory storing executable program instructions therein; and
    a processor in communication with the memory, the processor operative to execute the program instructions to:
        receive a set of requirements for a software application, the set of requirements comprising a plurality of software requirements identified for the software application;
        analyze the set of requirements to determine dependencies between the plurality of software requirements in the set of requirements;
        generate a visualization of the determined dependencies between the plurality of software requirements in the set of requirements;
        determine, based on the generated visualization, a test boundary for the set of requirements, the test boundary being defined by test inputs and test outputs for the plurality of software requirements in the set of requirements, including all controlled variables of the plurality of software requirements having a test output, all monitored variables of the plurality of software requirements having a test input, and all monitored variables of the plurality of software requirements having at least one dependent controlled variable included in the test boundary; and
        store the determined test boundary for the plurality of software requirements in the set of requirements in a record.

2. The system of claim 1, further comprising documenting definitions of the set of requirements for the software application, the documented definitions being used as a basis for the generation of the visualization of the determined dependencies.

3. The system of claim 2, wherein the definition of a requirement strictly defines a behavior of an internal requirement for the software application the internal requirement not being controllable or monitorable externally to the software application.

4. The system of claim 3, wherein the internal requirement is determined to be related to at least one external requirement of the software application during the analysis of the set of requirements, each of the at least one external requirement defined by a behavior of at least one external test input and external test output that is controllable or monitorable externally to the software application.

5. The system of claim 1, wherein the definition of a requirement of the set of requirements for the software application defines a behavior of a decomposition requirement for the software application, the decomposition requirement being fully defined based on at least one lower level requirement for the software application.

6. The system of claim 5, wherein the at least one lower level requirement uses test input and return parameters of the decomposition requirement as monitorable and controllable variables for the at least one lower level requirement.

7. The system of claim 1, further comprising using the record of the determined test boundary to at least one of (i) optimize test steps in a test procedure to satisfy a requirement test coverage for the software application and (ii) generate an executable test procedure that exercises external test inputs and test outputs for the software application.

8. A computer-implemented method comprising:
    receiving a set of requirements for a software application, the set of requirements comprising a plurality of software requirements identified for the software application;
    analyzing the set of requirements to determine dependencies between the plurality of software requirements in the set of requirements;
    generating a visualization of the determined dependencies between the plurality of software requirements in the set of requirements;
    determining, based on the generated visualization, a test boundary for the set of requirements, the test boundary being defined by test inputs and test outputs for the plurality of software requirements in the set of requirements, including all controlled variables of the plurality of software requirements having a test output, all monitored variables of the plurality of software requirements having a test input, and all monitored variables of the plurality of software requirements having at least one dependent controlled variable included in the test boundary, and
    storing the generated visualization of the determined test boundary for the plurality of software requirements in the set of requirements in a record.

9. The method of claim 8, further comprising documenting definitions of the set of requirements for the software application, the documented definitions being used as a basis for the generation of the visualization of the determined dependencies.

10. The method of claim 9, wherein the definition of a requirement strictly defines a behavior of an internal requirement for the software application, the internal requirement not being controllable or monitorable externally to the software application.

11. The method of claim 10, wherein the internal requirement is determined to be related to at least one external requirement of the software application during the analysis of the set of requirements, each of the at least one external requirement defined by a behavior of at least one external test input and external test output that is controllable or monitorable externally to the software application.

12. The method of claim 8, wherein the definition of a requirement of the set of requirements for the software application defines a decomposition requirement for the software application, the decomposition requirement being fully defined based on at least one lower level requirement for the software application.

13. The method of claim 12, wherein the at least one lower level requirement uses test input and return parameters of the decomposition requirement as monitorable and controllable variables for the at least one lower level requirement.

14. The method of claim 8, further comprising using the record of the determined test boundary to at least one of (i)

optimize test steps in a test procedure to satisfy a requirement test coverage for the software application and (ii) generate an executable test procedure that exercises external test inputs and test outputs for the software application.

15. A non-transitory computer readable medium having executable instructions stored therein, the medium comprising:

instructions to receive a set of requirements for a software application, the set of requirements comprising a plurality of software requirements identified for the software application;

instructions to analyze the set of requirements to determine dependencies between the plurality of software requirements in the set of requirements;

instructions to generate a visualization of the determined dependencies between the plurality of software requirements in the set of requirements;

instructions to determine, based on the generated visualization, a test boundary for the set of requirements, the test boundary being defined by test inputs and test outputs for the plurality of software requirements in the set of requirements, including all controlled variables of the plurality of software requirements having a test output, all monitored variables of the plurality of software requirements having a test input, and all monitored variables of the plurality of software requirements having at least one dependent controlled variable included in the test boundary, and instructions to store the determined test boundary of the plurality of software requirements in the set of requirements in a record.

16. The medium of claim 15, wherein the set of requirements include documenting definitions of the set of requirements for the software application, the documented definitions being used as a basis for the generation of the visualization of the determined dependencies.

17. The medium of claim 16, wherein a definition of a requirement strictly defines a behavior of an internal requirement for the software application, the internal requirement not being controllable or monitorable externally to the software application.

18. The medium of claim 17, wherein the internal requirement is determined to be related to at least one external requirement of the software application during the analysis of the set of requirements, each of the at least one external requirement defined by a behavior of at least one external input and external output that is controllable or monitorable externally to the software application.

19. The medium of claim 15, wherein a definition of a requirement of the set of requirements for the software application defines a behavior of a decomposition requirement for the software application, the decomposition requirement being fully defined based on at least one lower level requirement for the software application and the at least one lower level requirement uses input and return parameters of the decomposition requirement as monitorable and controllable variables for the at least one lower level requirement.

20. The medium of claim 15, further comprising instructions to use the record of the determined test boundary to at least one of (i) optimize test steps in a test procedure to satisfy a requirement test coverage for the software application and (ii) generate an executable test procedure that exercises external inputs and outputs for the software application.

* * * * *